United States Patent [19]
Diggs

[11] 3,982,524
[45] Sept. 28, 1976

[54] HEATER FOR ORCHARDS AND THE LIKE

[76] Inventor: Richard E. Diggs, 12 A Road, Carthage, Mo. 64836

[22] Filed: July 30, 1975

[21] Appl. No.: 600,453

[52] U.S. Cl. ............................ 126/59.5; 431/353
[51] Int. Cl.² ...................................... A01G 13/06
[58] Field of Search ................... 126/59.5; 47/2; 431/351, 352, 353

[56] References Cited
UNITED STATES PATENTS

| | | | |
|---|---|---|---|
| 1,571,969 | 2/1926 | Ruprecht | 126/59.5 |
| 1,758,941 | 5/1930 | Gibson | 126/59.5 |
| 2,217,536 | 10/1940 | Birrell | 126/59.5 |
| 3,200,539 | 8/1965 | Kelly | 126/59.5 X |
| 3,292,306 | 12/1966 | Carlson | 126/59.5 |
| 3,540,822 | 11/1970 | Filliol | 126/59.5 X |
| 3,796,209 | 3/1974 | Luft | 126/59.5 |

*Primary Examiner*—Edward G. Favors
*Attorney, Agent, or Firm*—Shoemaker and Mattare, Ltd.

[57] ABSTRACT

A heater for orchards and the like includes a stackable, heat transmitting, upright housing. A fuel burner is supported in the housing near a lower end thereof and includes an air inlet chamber having an annular, upwardly directed outlet at the periphery of a fuel dispersing plate and air flows through the outlet under pressure in an upward direction and with a spinning motion to vaporize fuel and convey it to a combustion zone for turbulent, substantially pollution-free combustion of the fuel. The burner may also be used with conventional orchard heater housings to provide substantially pollution-free heating of orchards and the like.

13 Claims, 6 Drawing Figures

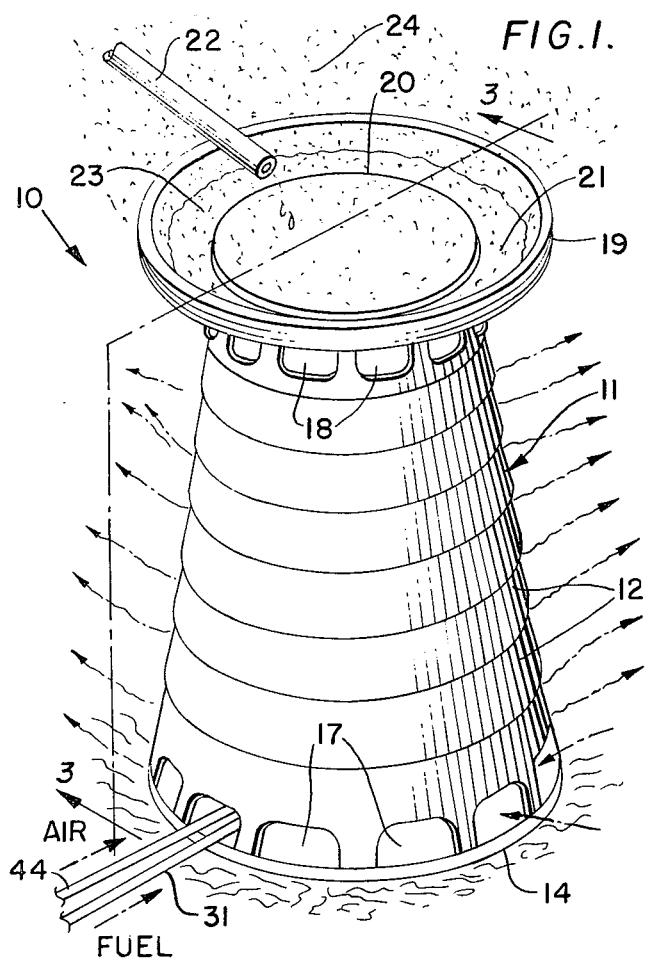
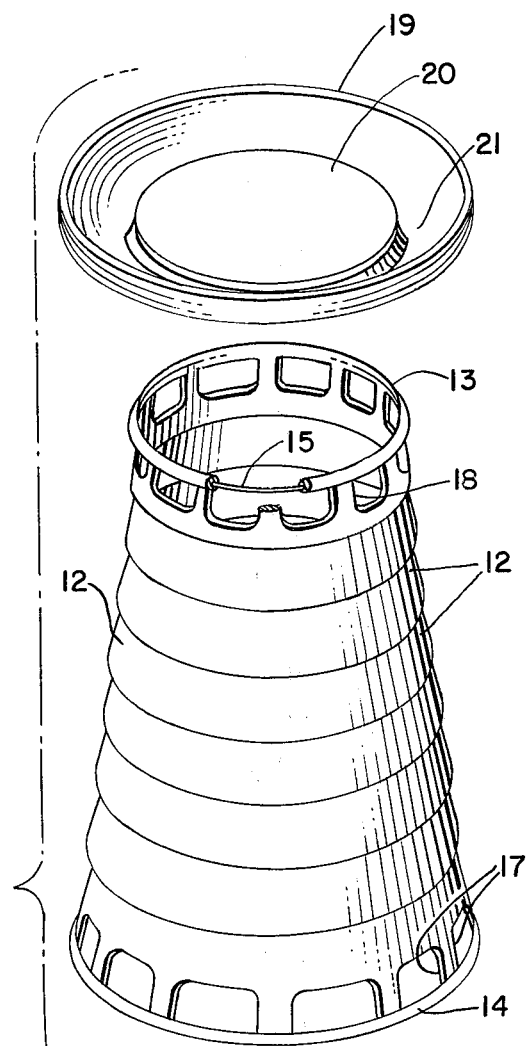
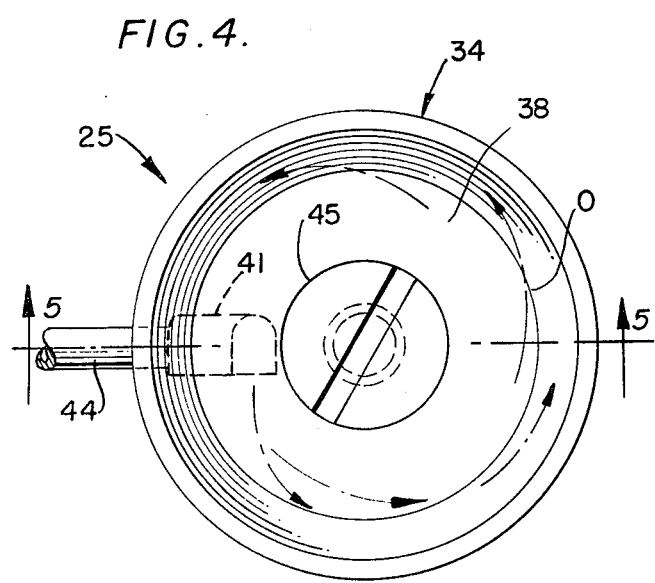
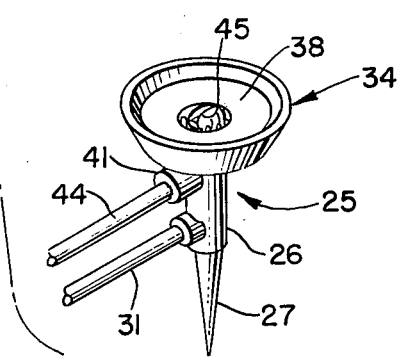

HEATER FOR ORCHARDS AND THE LIKE

BACKGROUND OF THE INVENTION

This invention relates to a heater for use in orchards and the like to prevent freezing of crops during cold or freezing weather.

More particularly, the present invention relates to an orchard heater which is substantially pollution-free in operation, and which emits a large amount of radiant heat into the surrounding crops to prevent freeze damage thereto.

Many prior art orchard heaters rely upon the burning of a fuel in a heater device which produces a certain amount of radiant heat energy and which also produces a large, dense cloud of smoke, which presents a thermal inversion layer to trap or prevent excessive radiation of the heat away from the earth's surface, thus preventing the area surrounding the crops and near the ground from becoming excessively cold. However, in recent years anti-pollution laws have necessitated that use of such heaters be discontinued. Accordingly, some alternate means of providing a substantially pollution-free heating of crops is necessary and desirable.

In accordance with the present invention, a unique heater is provided, which includes a stackable, heat transmitting housing, having a burner supported therein for substantially pollution-free combustion of fuel to emit a large amount of radiant energy toward surrounding crops, and which also may be provided with a fog or vapor producing pan on its top, which serves substantially the same purpose as the dense clouds of smoke previously produced, in that heat from the burner vaporizes water in the pan, and the vaporized water forms a layer or blanket of fog over the crops which helps to hold the heat near the ground and around the crops and prevent its escape into the atmosphere.

Still further, there are millions of old-style, conventional heaters in existence, and in view of the anti-pollution laws mentioned previously, such conventional heaters are not permitted to be used. The unique burner of the present invention may be easily used with such conventional heater bodies, thus enabling the millions of conventional heaters to be reclaimed and used.

OBJECTS OF THE INVENTION

Accordingly, it is an object of this invention to provide a substantially pollution-free heater for preventing freeze damage to crops and the like, wherein the heater includes a stackable housing capable of transmitting heat and having a substantially pollution-free burner supported therewithin for producing a highly turbulent flame within the housing to produce large amounts of radiant heat energy.

Another object of the invention is to provide a unique, substantially pollution-free burner for use with a heater for heating crops and the like, wherein the burner may be used with conventional heater bodies to produce substantially pollution-free heating of crops and the like.

A further object of the invention is to provide a substantially pollution-free heater for preventing freeze damage to crops and the like, wherein the heater is exceptionally simple and economical in construction, and wherein the heater body is tapered and open-ended, whereby a large number of heaters may be stored in stacked relationship, one upon the other.

BRIEF DESCRIPTION OF THE DRAWINGS

FIG. 1 is a top perspective view of a heater in accordance with the invention.

FIG. 2 is an exploded, perspective view of the burner, heater body and fog producing pan of the invention.

FIG. 4 is a greatly enlarged plan view of the burner taken along line 4—4 in FIG. 3.

DETAILED DESCRIPTION OF THE INVENTION

Figure 3:
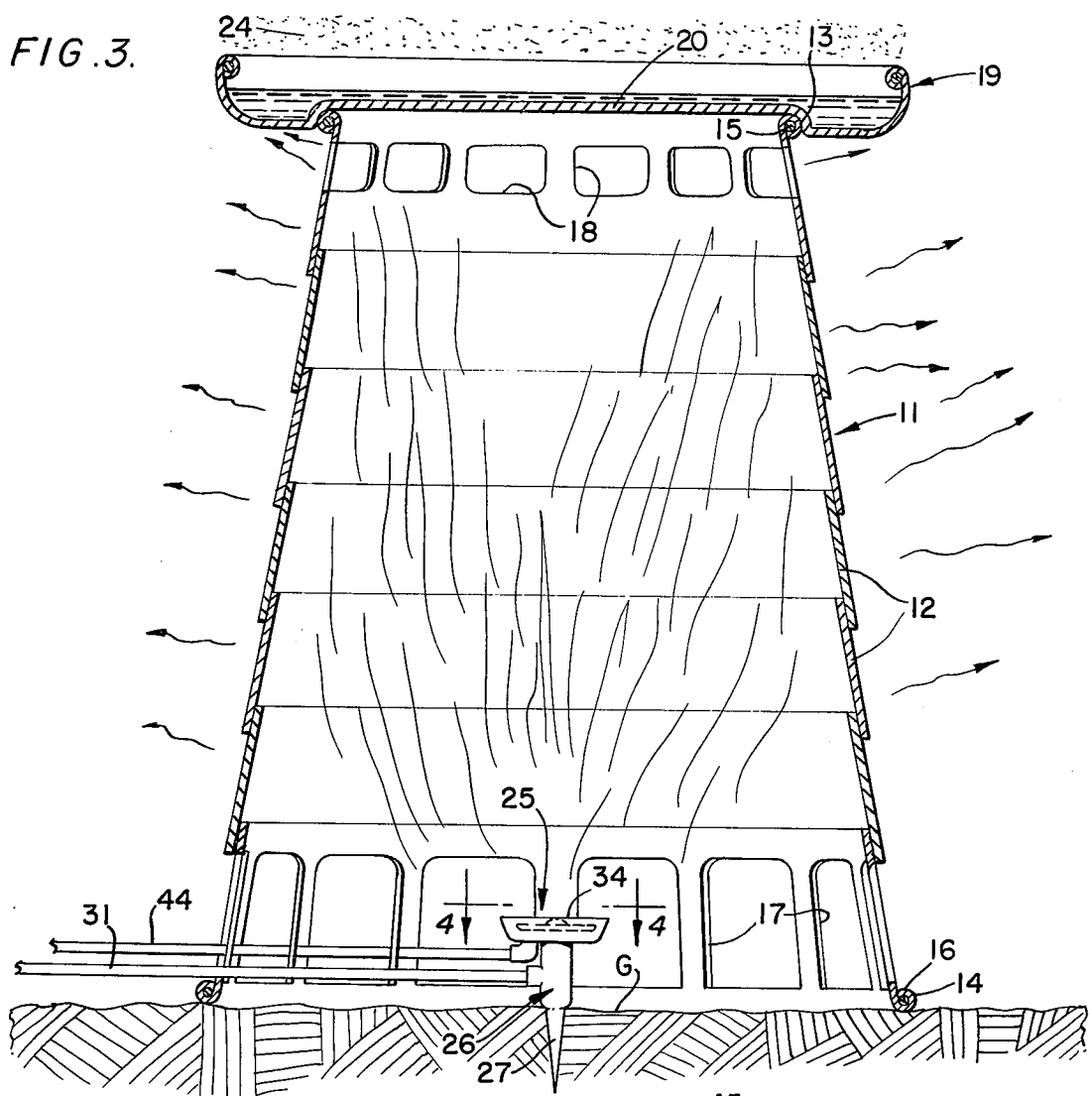
FIG. 3 is an enlarged, vertical, sectional view of the heater of the invention, taken along line 3—3 in FIG. 1.
Figure 5:
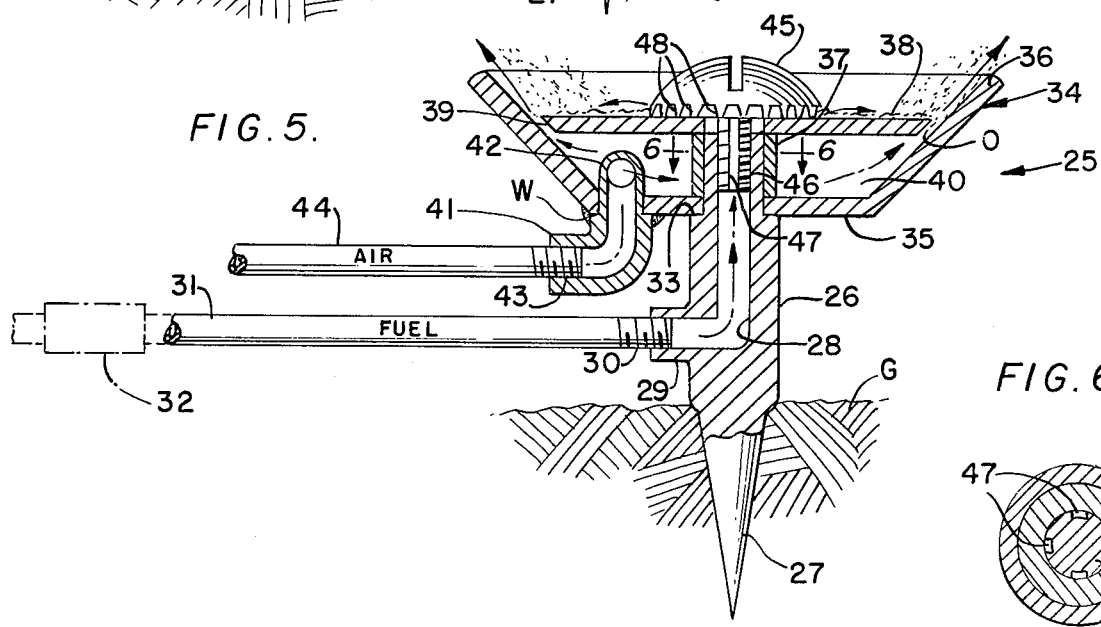
FIG. 5 is a greatly enlarged, vertical, sectional view of the burner of FIG. 3 taken along line 5—5 of FIG. 4.
Figure 6:
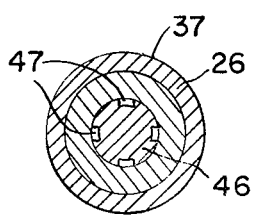
FIG. 6 is an enlarged, horizontal, sectional view taken along line 6—6 of FIG. 5.

In the drawings, wherein like reference numerals indicate like parts throughout the several views, a heater in accordance with the invention is indicated generally at 10 and comprises a generally frusto-conically shaped, open-ended, stackable, heat transmitting body 11 of sheet metal or the like, and in one particular construction of the invention, comprised of a plurality of annular, substantially frusto-conically shaped rings 12 stacked one upon the other, as seen best in FIG. 3, and suitably secured together. Alternatively, the body 11 may comprise a large sheet of metal rather than the stacked rings, as shown.

The top and bottom open ends of the body 11 are rolled, as at 13 and 14, respectively, and reinforced with circular wire rings or the like 15 and 16. Further, a plurality of air inlet apertures 17 are formed through the housing at the bottom end thereof, and a plurality of heat outlet openings 18 are formed through the body at the top thereof.

A vapor or fog producing circular tray 19 may be supported on the open upper end of the housing 11, if desired, and the tray 19 includes a central, upstanding, recessed portion 20, which fits down over the rolled open upper end of housing 11 for centering and retaining the tray in position on top of the housing. An annular trough 21 is thus formed circumferentially of the tray, and a water supply pipe 22 extends above the tray for supplying water 23 thereto to maintain a shallow level of water in the tray, whereby the heat produced in the housing by the burner vaporizes the water to produce a fog or vapor 24.

The burner 25 comprises an elongate body 26 having a projection or spike 27 on one end thereof, and a longitudinally extending fuel supply port or bore 28 opening through the other end thereof and extending laterally outwardly through the side of the body 26 between the ends thereof and opening through a boss 29 projecting laterally from one side of the body 26. The boss 29 is preferably internally threaded for mating, threaded cooperation with an externally threaded end portion 30 of a fuel supply pipe or conduit 31, which supplies fuel to the port or bore 28 and the fuel supply is metered or regulated by an orifice device or regulator or the like 32 in the fuel supply pipe or line 31. An external, annular, upwardly facing shoulder 33 is formed on the body 26 adjacent the upper end thereof and a generally dish-shaped air deflecting plate 34, having a substantially disc-shaped bottom wall 35 and a frusto-conically shaped upwardly and outwardly inclined side wall 36, is supported on the shoulder 33.

A tubular spacer sleeve 37 is disposed in surrounding relation to the upper end of body 26 and is supported on top of the bottom wall 35 of air deflector plate 34, and the upper end of spacer sleeve 37 is substantially coterminous with the upper end of body 26. An annular, disc-shaped, fuel dispersing plate 38 is supported on top of the spacer sleeve 37 and has a conically tapered outer peripheral edge 39 spaced radially inwardly from the side wall 36 of air deflector plate 34 a distance 2 or 3 thousandths of an inch to define an annular air outlet opening 0 around the fuel dispersing plate leading from an air inlet chamber 40 defined between the fuel dispersing plate 38 and air deflecting plate 34. An air inlet fitting 41 is secured to the air deflecting plate 34 and includes a circumferentially directed air inlet nozzle or opening 42 disposed inside the air inlet chamber 40 near one side thereof. The air inlet fitting 41 is secured to the air deflecting plate 34, as by means of a weld W or the like, and has an internally threaded end portion for mating, threaded cooperation with a threaded end 43 of an air supply pipe or conduit 44. A fuel metering screw 45 is threaded into the open upper end of fuel supply port 28 and has an externally threaded shaft 46, with longitudinally extending grooves 47 therein, for metering the supply of fuel from the port 28 to beneath the head of the screw 45, which has a plurality of radially extending serrations 48 therein to disperse or cause the fuel to flow evenly outwardly over the plate 38. Additionally, the fuel metering screw 45 serves to hold the air deflecting plate 34, spacer sleeve 37 and fuel dispersing plate 38 all tightly clamped and assembled to the body 26 of burner 25.

In use, fuel is supplied through line 31 at a pressure on the order of about 2 psi and air is supplied through line 44 at a pressure on the order of about 15 to 20 psi. The circumferentially introduced air has a swirling motion imparted thereto in the chamber 40 and it exits upwardly through the air outlet opening O, with an upwardly and outwardly directed swirling motion, where it shears off or picks up and vaporizes the liquid fuel flowing outwardly over the upper surface of plate 38 to convey the vaporized fuel upwardly into a combustion zone within the housing 11. The vaporized air-fuel mixture thus produced may be ignited with any suitable conventional means, as, for example, a hand-held torch or the like, or with automatic means, as is well known in the art.

The burner is supported in its upright position, as seen in the drawings, by insertion of the spiked end 27 into the surface of the ground G. The housing 11 may then be placed over the burner 25 or conventional type burner housings may also be placed over the burner 25 for producing radiant heat energy to prevent freeze damage to crops and the like.

The burner housing and fog producing tray may be economically produced from sheet metal materials or the like, and the burner 25 may be economically produced from metal or other suitable materials.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A substantially pollution-free heater for orchards and the like to prevent freeze damage to crops, comprising an upright, open-ended, stackable, heat-transmitting housing having air inlet ports in a lower side wall portion thereof and heat outlet ports in an upper side wall portion thereof, burner means supported in the housing near the lower end of the housing and including an elongate body with an upper end and a lower end and having a fuel supply passage extending longitudinally therethrough and opening at one end thereof axially outwardly through the upper end of the body, said fuel supply passage extending at its other end laterally outwardly through the side of the body and connected with a source of fuel; a generally dish-shaped air deflector plate supported on the body near the upper end thereof; a fuel dispersing plate supported on the upper end of the body in spaced relation to the air deflector plate and defining an air inlet chamber therewith, the air deflector plate having an upwardly directed side wall extending adjacent and spaced from the peripheral edge of the fuel dispersing plate and defining therewith an annular air outlet from the air inlet chamber; an air inlet to the chamber directed circumferentially thereinto to impart a swirling motion to air in the chamber, whereby air exiting the chamber is caused to spin to thus impart turbulence to the flow of air and fuel entrained therein and conveys the fuel to a combustion zone whereat substantially pollution-free turbulent combustion occurs.

2. A substantially pollution-free heater for preventing freeze damage to crops, comprising: an upright, open-ended, heat-transmitting, substantially frusto-conically shaped housing having air inlet openings in a lower end portion thereof and heat outlet openings in an upper end portion thereof; burner means supported in the housing near the lower end thereof and including an elongate body with an upper end and a lower end and having a fuel supply passage extending longitudinally therethrough and opening at one end thereof axially outwardly through the upper end of the body, said fuel supply passage extending at its other end laterally outwardly through the side of the body and connected with a source of fuel; a generally dish-shaped air deflector plate supported on the body near the upper end thereof; a fuel dispersing plate supported on the upper end of the body in spaced relation to the air deflector plate and defining an air inlet chamber therewith, the air deflector plate having an upwardly directed side wall extending adjacent and spaced from the peripheral edge of the fuel dispersing plate and defining therewith an annular air outlet from the air inlet chamber; an air inlet to the chamber directed circumferentially thereinto to impart a swirling motion to air in the chamber, whereby air exiting the chamber is caused to spin to thus impart turbulence to the flow of air and fuel entrained therein for producing turbulent, substantially pollution-free combustion; and a tray containing water supported on the upper end of the housing whereby heat produced by the burner means vaporizes the water and produces a layer of vapor or fog to retard escape of heat from near the surface of the ground into the atmosphere.

3. A heater as in claim 2, wherein the housing is made of sheet metal.

4. A heater as in claim 5, wherein the tray has an upstanding portion in the bottom thereof defining a recess for receiving the upper end of the housing to retain the tray in position on the housing.

5. A substantially pollution-free heater for preventing freeze damage to crops, comprising:
- an upright, open ended heat transmitting housing having air inlet ports in a lower side wall portion thereof and heat outlet ports in an upper side wall portion thereof;
- burner means located within said housing and including an elongate body having mounting means on one end thereof for mounting said burner means within said housing;
- a hollow mixing means mounted on said elongate body for mixing fuel and air together and producing a combustible mixture, said mixing means having a base attached to the other end of said elongate body and a side wall attached to said base to be inclined away from said elongate body;
- a fuel supply passage located in said elongate body and connected to a fuel source for supplying fuel to said burner;
- a fuel dispensing means attached to said elongate body other end and located inside said hollow mixing means in a position so that said fuel dispensing means, said base and a portion of said side wall define a chamber, said fuel dispensing means being spaced apart from said side wall to define an annular space between said side wall and said fuel dispensing means, said fuel dispensing means having fuel flow guiding means thereon which are connected to said fuel supply passage to produce a film of fuel flowing into said annular space;
- an air inlet means connected to an air source for supplying air to said burner means, said air inlet means being located inside said chamber adjacent said fuel dispensing means and oriented to inject air into said chamber in a manner such that said air swirls about said chamber and exits therefrom via said annular space thereby intersecting fuel flowing thereinto to vaporize said fuel and convey said vaporized fuel out of said mixing means into a combustion zone located within said heat transmitting housing to be there ignited for producing turbulent substantially pollution free combustion, thereby producing heat which is transferred to the crops via said heat transmitting housing; and
- a tray containing water supported on said housing in a location whereat heat produced by said combustion vaporizes said water to produce a layer of vapor which retards the escape to the atmosphere of heat transferred to the crops via said housing.

6. A heater as in claim 5 wherein said fuel dispensing means includes a fuel dispensing plate attached to said elongate body other end.

7. A heater as in claim 6 further including a fuel metering screw attaching said fuel dispensing plate to said elongate body other end and having a groove therein which is in fluid communication with said fuel supply passage, and fuel flow passages connected to said groove for guiding fuel onto said dispensing plate in a manner such that said fuel flows into said annular space.

8. A heater as in claim 7 wherein said mixing means is frusto-conically shaped and said fuel dispensing plate is substantially circular so that said chamber is essentially frusto-conical in shape.

9. A heater as in claim 8 wherein said air inlet means directs air tangentially of said dispensing plate.

10. A heater as in claim 5 wherein said mounting means includes a spike.

11. A heater as in claim 6 wherein said dispensing plate has an outer peripheral edge which is tapered to correspond to the incline of said side wall.

12. A heater as in claim 9 wherein said fuel supply passage comprises a first section extending transversely of said elongate body and a second section extending longitudinally of said elongate body.

13. A heater as in claim 5, wherein a spacer sleeve is on the body between the air deflector plate and fuel dispersing plate, maintaining them in predetermined spaced apart relation.

* * * * *